(12) United States Patent
Lipford et al.

(10) Patent No.: US 9,615,548 B2
(45) Date of Patent: Apr. 11, 2017

(54) HUMMINGBIRD FEEDER AND FEED POD

(71) Applicants: Brian Lipford, Bel Air, MD (US);
Sharon Lipford, Bel Air, MD (US);
Keith Lipford, Baltimore, MD (US);
Christopher Dykes, Columbia, MD (US); Pamela Glasgow, Hockessin, DE (US)

(72) Inventors: Brian Lipford, Bel Air, MD (US);
Sharon Lipford, Bel Air, MD (US);
Keith Lipford, Baltimore, MD (US);
Christopher Dykes, Columbia, MD (US); Pamela Glasgow, Hockessin, DE (US)

(73) Assignee: Perla, LLC, Bel Air, MD (US)

( * ) Notice: Subject to any disclaimer, the term of this patent is extended or adjusted under 35 U.S.C. 154(b) by 0 days.

(21) Appl. No.: 14/578,971

(22) Filed: Dec. 22, 2014

(65) Prior Publication Data
US 2016/0007574 A1     Jan. 14, 2016

Related U.S. Application Data

(60) Provisional application No. 62/022,872, filed on Jul. 10, 2014, provisional application No. 62/077,937, filed on Nov. 11, 2014.

(51) Int. Cl.
*A01K 39/02* (2006.01)
*A01K 39/01* (2006.01)

(52) U.S. Cl.
CPC .......... *A01K 39/0206* (2013.01); *A01K 39/01* (2013.01); *A01K 39/02* (2013.01)

(58) Field of Classification Search
CPC ........ A01K 39/00; A01K 39/01; A01K 39/02; A01K 39/0206
USPC .............. 119/52.2, 52.3, 57.8, 57.9, 72, 72.5
See application file for complete search history.

(56) References Cited

U.S. PATENT DOCUMENTS

| | | | | |
|---|---|---|---|---|
| 2,570,733 A | * | 10/1951 | Thomas | A01K 39/0206 119/72 |
| 5,450,816 A | * | 9/1995 | Santa Cruz | A01K 39/0206 119/57 |
| 5,640,927 A | * | 6/1997 | Klein | 119/72 |
| 5,947,054 A | * | 9/1999 | Liethen | 119/57.9 |
| 6,499,430 B2 | * | 12/2002 | Garcia-Lucio | A01K 7/00 119/72 |

(Continued)

*Primary Examiner* — David Parsley
(74) *Attorney, Agent, or Firm* — Larry J. Guffey, Esq.; Oliver & Grimsley, LLC

(57) ABSTRACT

A hummingbird feeder having a disposable, single-use feed pod containing a liquid hummingbird food and a feeder assembly including a feed pod support for positioning the feed pod in a desired orientation. The feed pod is supported and oriented in the feed pod support and keeps liquid food for touching the hummingbird feeder other that the feed pod. The hummingbird feeder can include an access cover with a port located generally in the center thereof through which the hummingbird can access the hummingbird food. The access cover engages the feed pod and includes a projection that can pierce the top of the feed pod where access can be had to the food by a hummingbird through the port. The feeder can also have no access cover, in which case a port is provided in the top of the feed pod. Multiple feeder assemblies and feed pods can be configured together.

12 Claims, 12 Drawing Sheets

(56) References Cited

U.S. PATENT DOCUMENTS

| | | | |
|---|---|---|---|
| 6,739,284 B1 * | 5/2004 | Olive | 119/74 |
| 7,634,974 B1 * | 12/2009 | Puckett | A01K 39/014 |
| | | | 119/61.57 |
| 8,245,667 B2 | 8/2012 | Mateer et al. | |
| 8,276,541 B2 * | 10/2012 | LoRocco et al. | 119/72 |
| 8,291,861 B2 * | 10/2012 | Hepp et al. | 119/65 |
| 8,387,567 B1 * | 3/2013 | Hill | 119/72 |
| D683,912 S * | 6/2013 | Muhr | D30/124 |
| 8,539,910 B1 * | 9/2013 | Hensley | 119/72 |
| 8,763,556 B1 * | 7/2014 | Vaughn, Jr. | 119/74 |
| 2004/0103851 A1 * | 6/2004 | Hunter | A01K 39/02 |
| | | | 119/72 |
| 2005/0126503 A1 * | 6/2005 | Fort, II | 119/72 |
| 2009/0308321 A1 * | 12/2009 | Szczygiel-Durante | A01K 39/0206 |
| | | | 119/72 |

* cited by examiner

HUMMINGBIRD FEEDER AND FEED POD

REFERENCE TO RELATED CASES

The present patent application is based upon and hereby claims priority to provisional patent application, U.S. Ser. No. 62/022,872, filed Jul. 10, 2014, and entitled "Hummingbird Feeder" and provisional patent application, U.S. Ser. No. 62/077,937, filed Nov. 11, 2014, and entitled "Hummingbird Feeder and Feed Pod" and the entire specifications of both of the aforementioned applications are hereby incorporated herein in their entirety by reference.

FIELD OF THE INVENTION

This invention relates to bird feeders, and specifically, to a hummingbird feeder for providing a food substance, such as a solution of sugar and water, for hummingbirds.

BACKGROUND OF THE INVENTION

Hummingbird feeders are typically constructed to contain and supply a liquid solution comprising sugar and water intended to simulate flower nectar, one of the hummingbird's natural foods. Over time, this sugar solution coats the internal passageways and compartments of the hummingbird feeder, resulting in the accumulation of bacteria, mold, and other contaminants. Accordingly, proper care of hummingbird feeders requires regular flushing and cleaning, which can require special tools to access the narrow passageways and compartments. In addition, the solution of sugar-water must also be regularly replaced, which requires the need to prepare or purchase new food. Accordingly it would be advantageous to provide a feeder for hummingbirds which does not require flushing or cleaning, and which facilitates the easy care and feeding of hummingbirds.

SUMMARY OF THE INVENTION

The present invention is a novel and useful hummingbird feed pod, as well as an attractive hummingbird feeder having the structure to support as well as provide access to the contents of the feed pod. As such, with the present invention, the hummingbird feeder is constructed such that no part of the hummingbird feeder comes in contact with the sugar-water solution with the exception of the feed pod that has a reservoir containing the sugar-water solution, and can be readily inserted into and removed from the hummingbird feeder, that is, there are no passageways or areas of the hummingbird feeder of the present invention that need to be cleaned as a result of having the sugar-water solution contained therewith.

The use of the feed pod, that may be disposable or reusable, allows that the sugar-water solution within the hummingbird feeder is retained solely within the feed pod and access to the sugar-water solution is by the hummingbird only. The reservoir of the sugar-water solution is constructed such that the feed pod is upright and there is no gravity feed within the hummingbird feeder so as to eliminate the contact of the sugar-water solution with any passageways or reservoirs that would require cleaning.

Upon the emptying of a feed pod, it is easily removed and replaced by a new feed pod still without the sugar-water solution passing through any passageways such that the replacement of a feed pod is easy and yet still isolates the sugar-water solution from contacting other components of the hummingbird feeder.

As an exemplary embodiment of the present invention, there is a specially designed feed pod that has a reservoir that contains the sugar-water solution. The feed pod may be a disposable plastic feed pod that has an upper opening with a cover sealing the opening and which can be penetrable by some means to access the sugar-water solution. Alternatively, the feed pod may be a reusable or disposable feed pod that has an inner cover that covers the upper opening and which has a hole sized to accommodate the beak and tongue of a hummingbird but also has an outer cover that is removable by a user to uncover the inner cover to allow access by a hummingbird to the sugar-water solution through the specially sized hole.

Other features of the present hummingbird feeder will become more apparent in light of the following detailed description of a preferred embodiment thereof and as illustrated in the accompanying drawings.

DETAILED DESCRIPTION OF THE INVENTION

Figure 1:
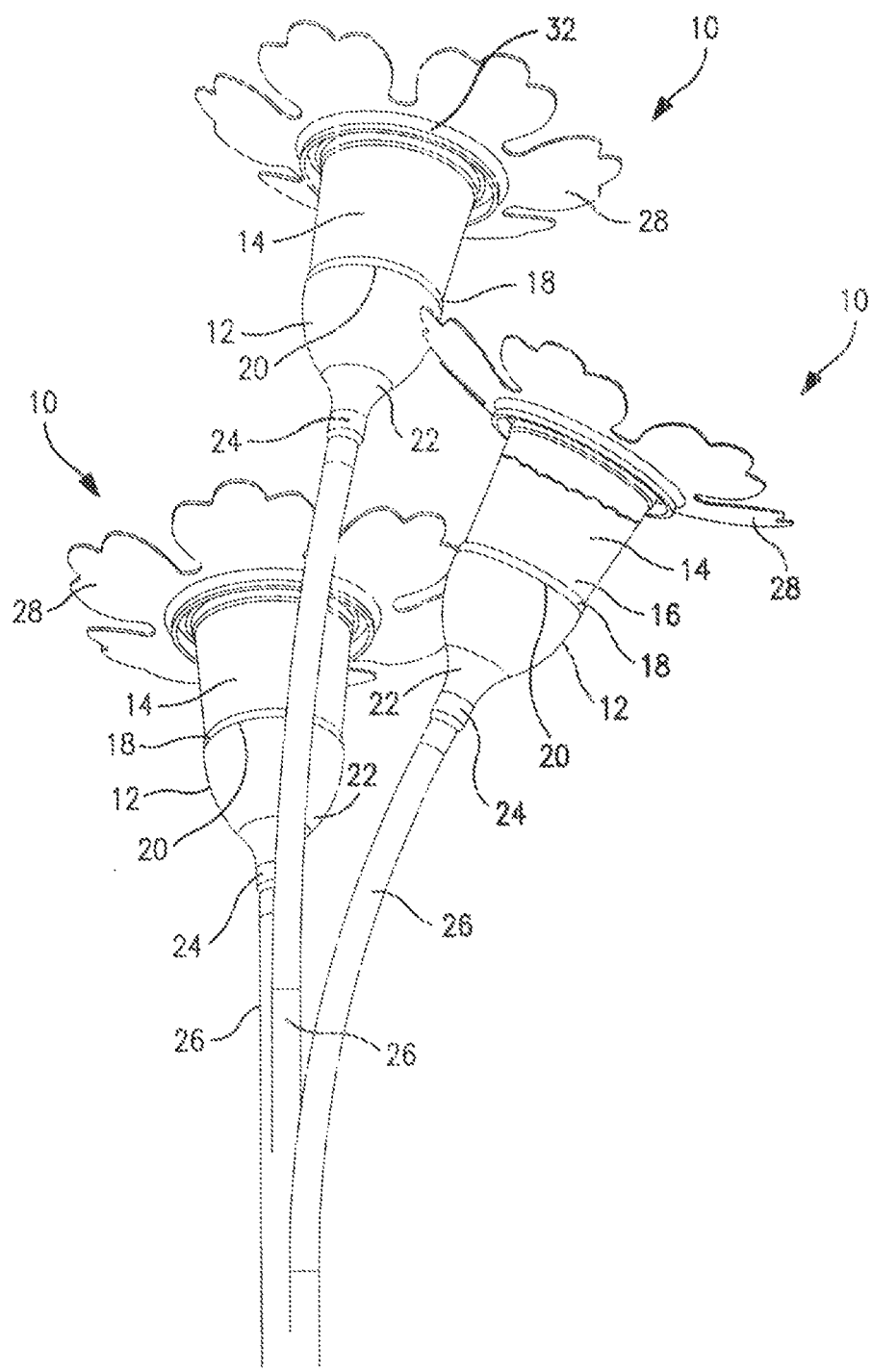
FIG. 1 is a perspective view of an arrangement of hummingbird feeders according to an embodiment of the invention.
Figure 2:
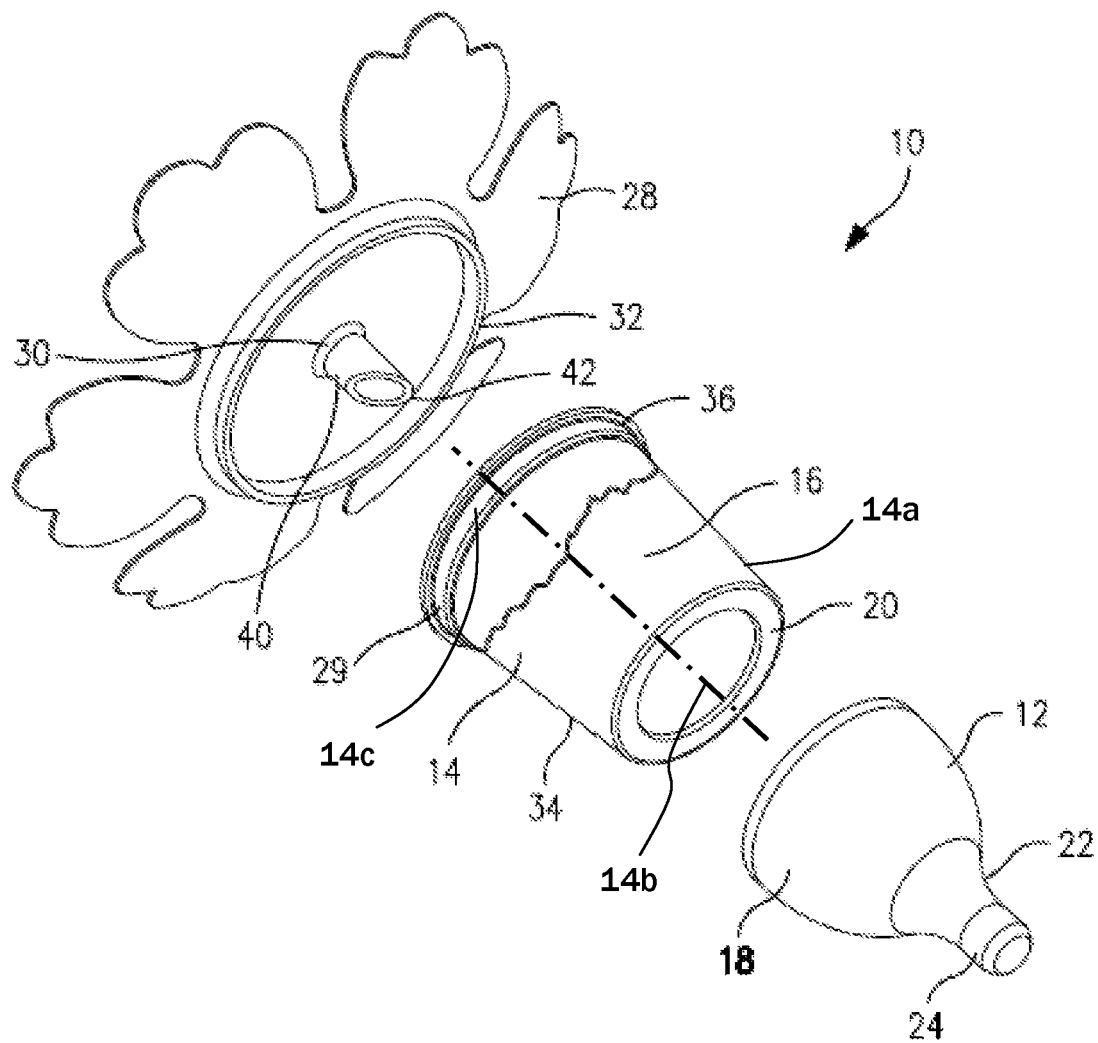
FIG. 2 is an exploded perspective view of the hummingbird feeder shown in FIG. 1.

Turning initially to FIGS. 1 and 2 there is shown a perspective view of a plurality of hummingbird feeders 10 and an exploded view of a single hummingbird feeder 10. In FIG. 1, therefore, each hummingbird feeder 10 comprises a pod support 12 that provides support for a feed pod 14. The details of the feed pod 14 will be later explained; however it contains a quantity of a sugar-water solution 16. The sugar-water solution 16 preferably contains no flavoring or preservatives such that it closely approximates the nectar of flowers that is one of the hummingbird's natural foods. The sugar-water solution 16 may, however, contain inhibitors to prevent the growth of mold and other contaminants present during packaging.

As can be seen in FIG. 1, the feed pod 14 rests in the pod support 12 and may be snapped into the pod support 12. The feed pod 14 is preferably translucent or clear so that the amount of sugar-water solution in the feed pod 14 can be readily ascertained visually from its exterior; however, the feed pod 14 may be colored or uncolored. Likewise, the sugar-water solution 16 in the feed pod 14 can also be clear or colored to be able to better assess the condition of the sugar-water solution 16 and the amount of sugar-water solution 16 that remains in the feed pod 14.

The feed pod 14 is preferably sized to hold a limited volume of sugar-water solution 16 such that it can provide enough food to feed several birds for a period of several days. The feed pod 14 is also preferably sized so that an average adult hummingbird can reach or nearly reach the bottom of the feed pod 14 with its long beak and tongue through a port in the hummingbird feeder 10. After a period of several days, it is expected that the sugar-water solution will need to be replaced due to spoilage since the sugar-water solution normally sits outside, usually in sunlight and/or high temperature conditions. The limited volume in the feed pod 14 is intended to provide sufficient food over the several day periods, while limiting the amount of food that needs to be discarded due to spoilage.

The pod support 12 defines a cavity 18 configured to match and receive the bottom 20 of the feed pod 14. According to the embodiment of FIGS. 1 and 2, the bottom 20 of feed pod 14 is generally flat and the feed pod 14 can be designed so as to snap into the pod support 12, however, other ways of attaching the feed pod 14 to the pod support 12 can be used. The body of the feed pod is configured to resemble the center of a single, actual flower and has a tubular wall 14a with top and bottom ends between which extends a longitudinal axis or centerline 14b for the pod. The pod's bottom ends has a bottom 20 or bottom surface which has a defined surface area, while its top ends has a perimeter rim 50 that surrounds an opening 14c to the pod's cavity or reservoir and this opening also has a specified surface area. The pod's tubular wall 14a, as it extends from its bottom to top ends, diverges outwardly from the pod's longitudinal centerline 14b so that the surface area of the reservoir's opening 14c is greater that the surface area of its bottom surface 20.

At the bottom 22 of the pod support 12, there may be a socket 24 that is dimensioned to receive a feeder stem 26 so that the hummingbird feeder 10 can be positioned in a relatively stationary location atop of a feeder stem 26 in a location preferred by hummingbirds.

The hummingbird feeder 10 includes an access cover 28 that is configured to resemble a flower. The center of access cover 28 defines an access port 30, through which a hummingbird may access the sugar-water solution 16 within the feed pod 14 using its long beak and tongue. The underside of access cover 28 is configured to removably snap or otherwise attach to the feed pod 14.

Figure 10:
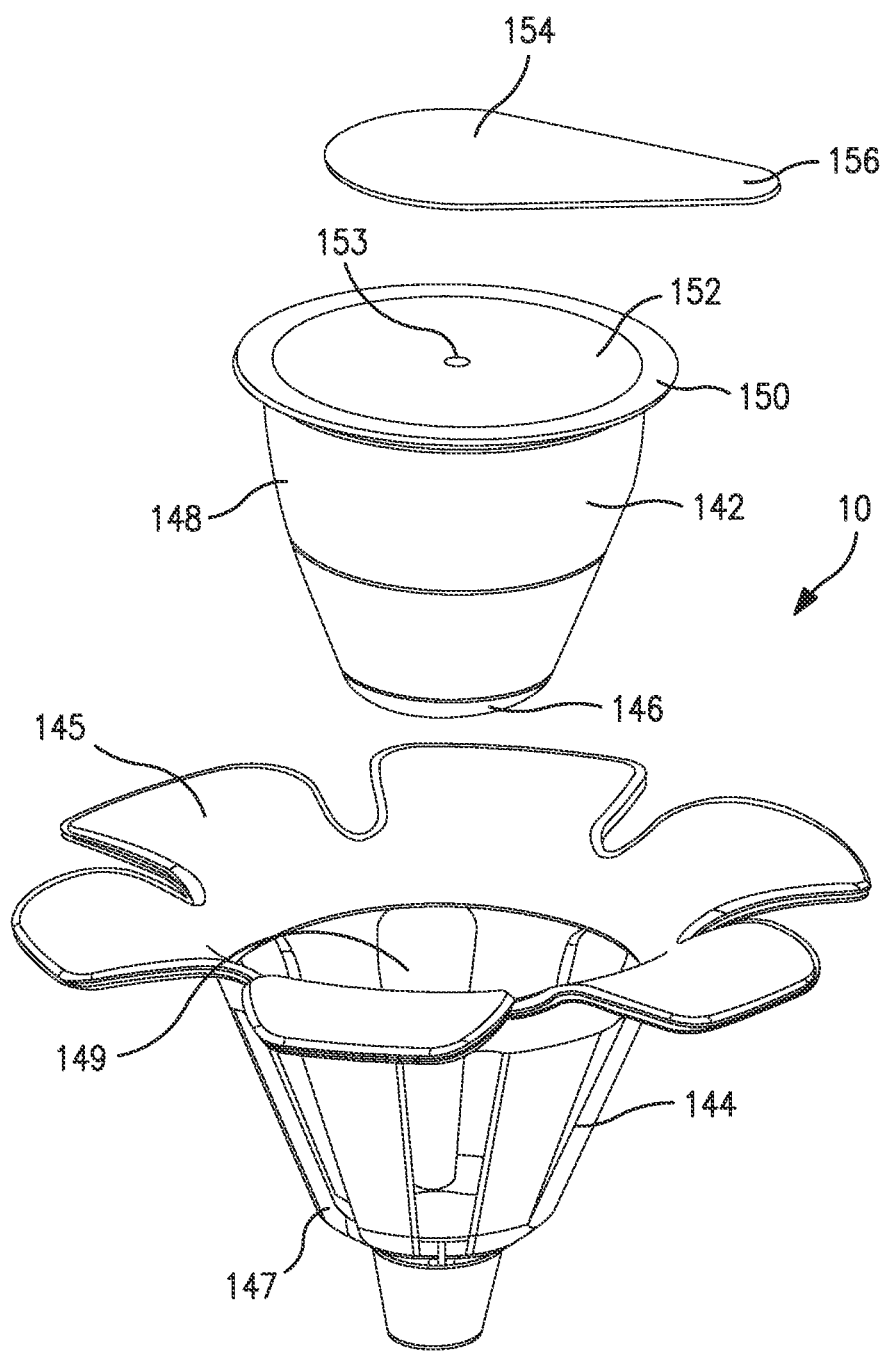
FIG. 10 is a an exploded view of a hummingbird feeder and illustrating an alternative embodiment of the feed pod for the hummingbird feeder of the present invention.
Figure 11:
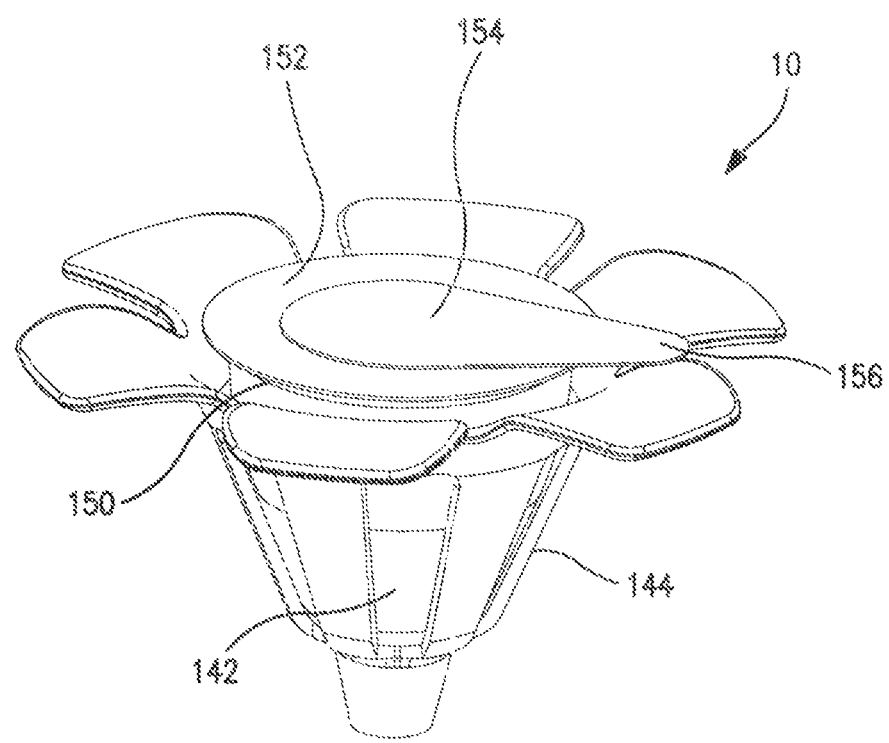
FIG. 11 is a perspective view of the assembled hummingbird feeder of the FIG. 10 embodiment.

According to the embodiment of FIG. 1, the underside of access cover 28 has a generally annular flange 32 that may be configured to resemble the underside of a flower and which is adapted to fit around the upper perimeter rim 29 of the feed pod 14. Each of the access cover 28, feed pod 14, pod support 12 and the feeder stem 26 are preferably made of plastic, and are configured so that the assembled hummingbird feeder 10 generally resembles a flower at the end of a flower stem but can also resemble any shape and color found to be pleasing to hummingbirds. In resembling a flower, the feed pod 14, as shown in FIGS. 10-11, can resemble the center of an actual-size flower or replica flower by having a configuration adapted to fit within the interior volume 149 defined or encompassed by the spreading petals 145 of an individual, actual-size, flower or replica flower and the thickening part of the stem or receptacle 147 from which the flower grows. For the actual size, flower replica shown in FIGS. 10-11, we denote the spreading petals and the thickening part of the stem as elements of a feed pod support 144.

Turning then specifically to FIG. 2, taken along with FIG. 1, the feed pod 14 has an outer, thin plastic shell 34 and is preferably provided with a top cover 36 comprising an airtight foil or other material to seal the upper perimeter rim 29 of the feed pod 14. In accordance with the present invention, the feed pod 14 can be quickly and easily replaced. When in place, the feed pod 14 allows access to the sugar-water solution 16 within the feed pod 14 by hummingbirds, but inhibits or prevents access by other creatures.

The top cover 36 of the feed pod 14 preferably is a thin material that is sealed around the upper perimeter rim 29 of the feed pod 14 and provides a hermetic seal to allow long-term storage of the sugar-water solution in the feed pod 14. The top cover 36 might be in the form of a thin, plastic-coated foil or other similar materials.

As also can be seen in FIG. 2, there is a projection 40 that extends downwardly from the access cover 28 and which has a distal end 42. The act of placing the access cover 28 over and on top of the feed pod 14 causes the distal end of the projection 42 to penetrate through the top access cover 36 providing access to the hummingbird food 16.

The top cover 36, seal and materials of construction of the feed pod 14 are selected to limit the ingress of air and other contaminants that can spoil the sugar-water solution contained therein. The top cover 36 of the feed pod 14 is designed such that it can be easily opened by tearing or puncturing and may also have a seal that can be pulled off by the user before or after loading the feed pod 14 into the hummingbird feeder 10. The feed pod 14 can have a variety of shapes, and according to various embodiments it may have a generally cylindrical shape/circular cross section, which may slightly widen or flare from bottom to top. However, the feed pod 14 may take any shape that is adapted to fit into a hummingbird feeder or, for that matter, into a recess of prior art hummingbird feeders that are configured to hold the sugar-water hummingbird food solution.

The access port 30 located at, or near, the center of the access cover 28 allows a hummingbird to access the sugar-water solution 16 in the feed pod 14 with its long beak and tongue through the projection 40. The feed pod 14 is dimensioned along with the access cover 28 so as to allow the distal end 42 of the projection 40 to extend downwardly into feed pod 14 to a location proximate to but not touching the sugar-water solution 16 within the feed pod 14 so that a hummingbird can reach or nearly reach the bottom of the feed pod 14 with its long beak and tongue, through the access port 30 in the access cover 28 and the projection 40.

Figure 3:
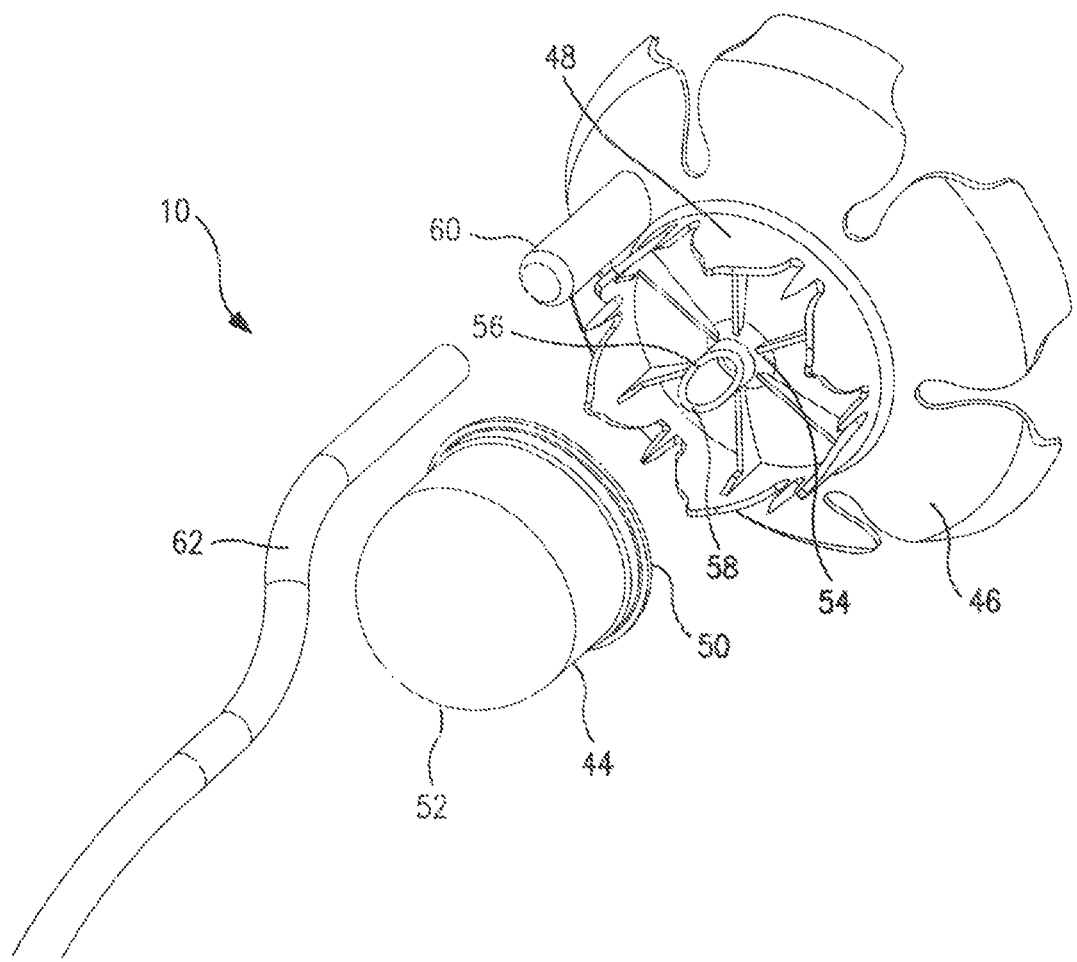
FIG. 3 is an exploded view of an alternative embodiment of the hummingbird feeder.

Turning then to FIG. 3, there is an exploded view of the present invention showing an alternative embodiment of a hummingbird feeder 10. In this embodiment, the feed pod 44 may be snapped directly into the underside of access cover 46 having an annular flange 48 that covers the upper surface of the feed pod 44 formed by the upper perimeter rim 50 when the feed pod 44 is snap-fitted to the access cover 46. In this embodiment, the feed pod 44 may have a bottom 52 that is rounded or other configuration.

As also can be seen in FIG. 3, the upper surface of the feed pod 44 formed by the upper perimeter rim 50 may have a thin foil that is penetrable or manually removable. Again, the access cover 46 may be in the shape of a flower so as to be attractive to hummingbirds and has an access port 54 that passes therethrough. On the underside of the access cover 46 there is a sharp projection 56 that is in alignment with the access port 54 and extends downwardly toward the feed pod 44. As the feed pod 44 and the access cover 46 are snapped together, the sharp projection 56 will penetrate the upper surface foil material within the upper perimeter rim 50 and the projection 56 will enter the feed pod 44, creating access for a hummingbird.

It is noted that in this, and the other exemplary embodiments, the distal end 58 of the projection 56 enters into the upper area of the feed pod 44 so that the hummingbird can access the sugar-water solution continued therein, however, the projection 56 is dimensioned along with the other relevant components such that the distal end 58 of the projection 56 does not actually touch the sugar-water solution but remains slightly above the level of the sugar-water solution so that only the feed pod 44 itself contacts the sugar-water solution.

There is also a socket 60 provided in access cover 46 that is dimensioned to receive a feeder stem 62 so that the hummingbird feeder 10 can be positioned in a relatively stationary location atop of a feeder stem 62 in a location preferred by hummingbirds. The free end of the feeder stem 62 can then be placed in the soil of a garden or flower pot, or attached to a deck rail or other structure via a mounting base.

In the FIG. 3 approach, as can be seen, the feed pod 44 can be loaded from the bottom of the access cover 46 in forming the hummingbird feeder 10. The process of placing the feed pod 44 up into the access cover 46 can be used to break the upper surface 50 of the feed pod 44 by means of the projection 56, to give the hummingbirds access to the food. A simple snap feature on the access cover 46 can be used to hold the feed pod 44 in place once loaded up into the access cover 46. Alternatively, of course, the feed pod 44 may be pre-opened by means such as peeling off a protective cover so that the upper area of the feed pod 44 is already open when the feed pod 44 is attached to the access cover 46.

Figure 4:
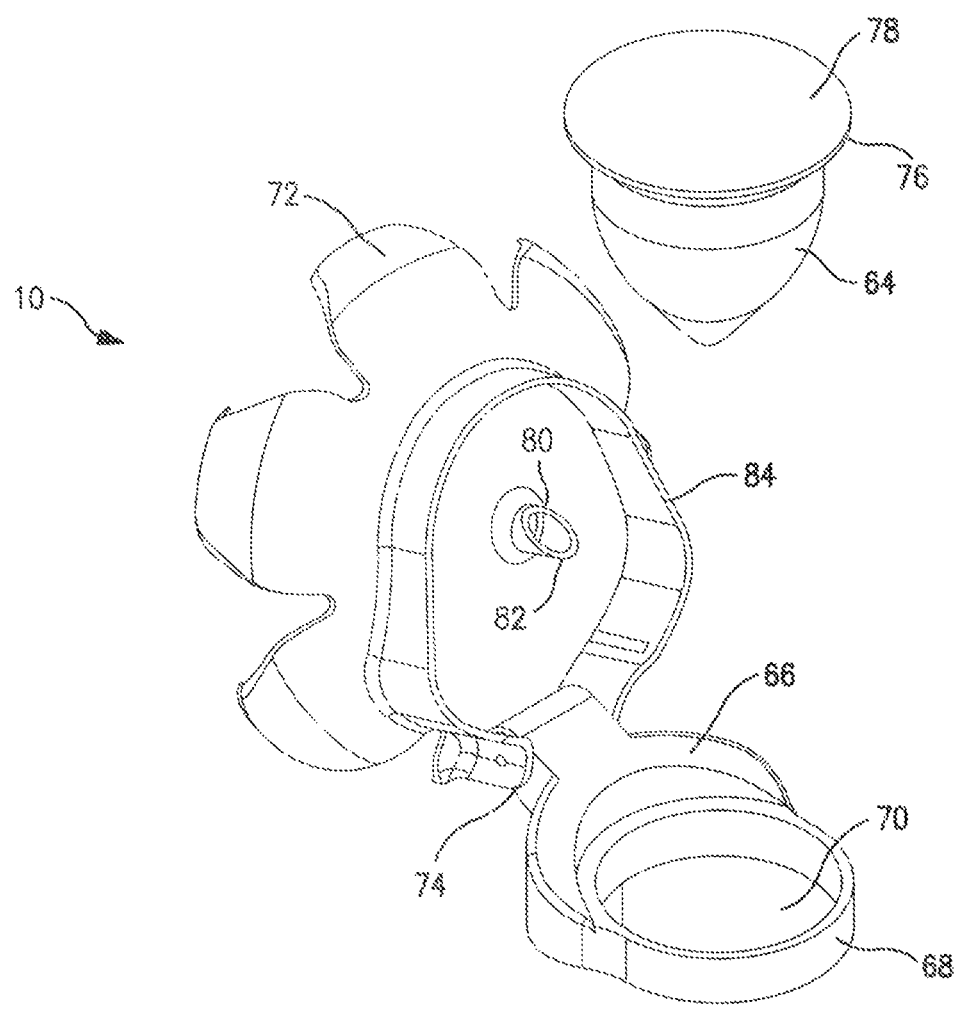
FIG. 4 is an exploded view of a feed pod and pod support used with the present invention.

Turning then to FIG. 4, there is an exploded view of an exemplary embodiment of the present hummingbird feeder 10 illustrating a feed pod 64 in position for installation. The feed pod 64 is supported in a pod support 66 which includes a generally ring shaped bracket 68 forming a circular shaped opening 70 configured to receive and support the feed pod 64. In this embodiment, the feed pod 64 fits into the ring shaped bracket 68 and an access cover 72 is affixed to the feed pod support 66 by means of a hinge 74.

The top of the feed pod 64 has an integral flange 76 that prevents the feed pod 64 from falling through the circular opening 70 when installed therein, or the shape of the feed pod may simply be wide or flared enough to prevent it from falling through the circular opening 70. Feed pod 64 has an upper surface 78 that may be made up of a thin foil or similar material to seal the feed pod 64 from the environment.

Accordingly, again, the access cover 72 of the FIG. 4 embodiment may take the shape of a flower to attract the hummingbirds and includes a sharp projection 80 having a distal end 82. A through hole in the access cover 72 is concentric with the sharp projection 80. Due to the pivotal motion of the access cover 72 about hinge 74, the access cover 72 may be moved between a first position as shown in FIG. 4 where the access cover 72 is displaced away from the feed pod 64 and a second position (not shown in FIG. 4) where the access cover 72 has been pivoted into contact with the feed pod 64 and the projection 80 and distal end 82 enter into the feed pod 64. When the access cover 72 is pivotally moved in this manner, the projection 80 and the distal end 82 are used to break or tear the upper surface 78 of feed pod 64. Note, again, that the projection 80 extends into the interior of the feed pod 64 with its distal end 82 located proximate to but not touching the sugar-water solution contained within the feed pod 64.

In FIG. 4, there can also be seen, an annular flange 84 depending downwardly from the access cover 72 that may be configured to resemble the underside of a flower and which is adapted to fit around the outside top surface of the pod support 66 to limit physical access by bees and other insects.

Figure 5:
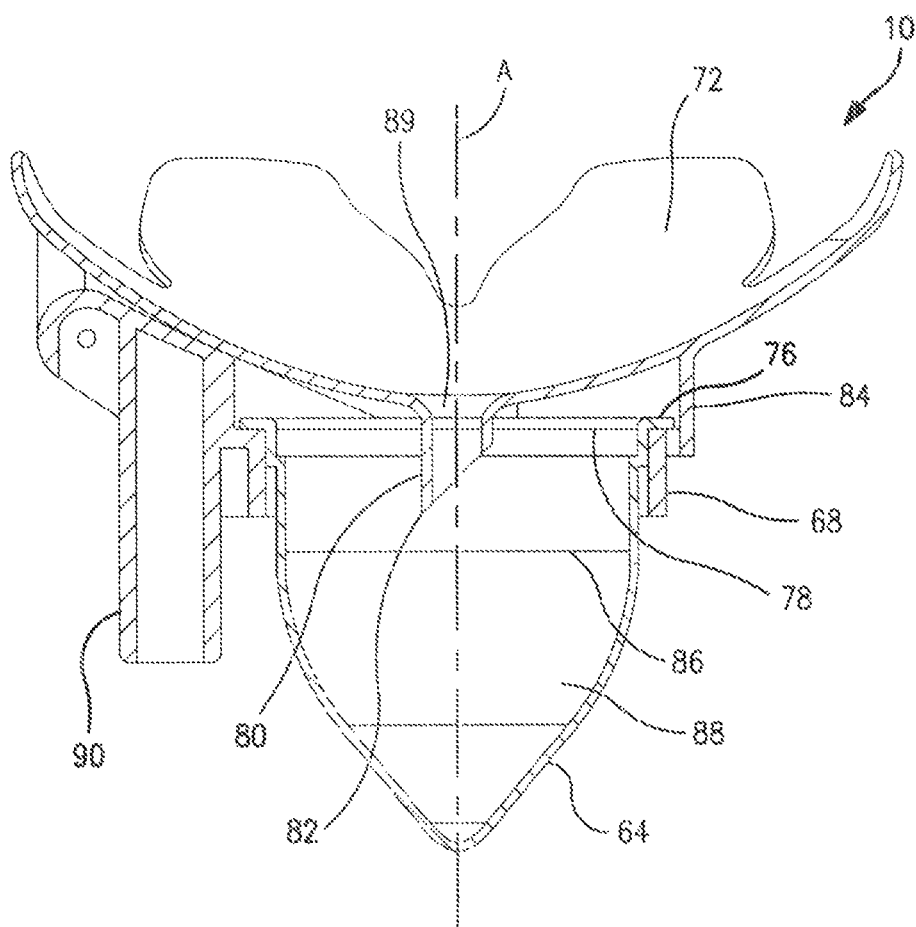
FIG. 5 is a side cross sectional view, partially cutaway, illustrating the feed pod and pod support of FIG. 4.

Turning to FIG. 5, taken along with FIG. 4, there is shown a side cross-sectional view of the embodiment of FIG. 4 wherein the access cover 72 has been moved to its second position where the projection 80 has entered into the interior of the feed pod 64 such that the distal end 82 of the projection 80 is positioned proximate to but just above the highest level 86 of the sugar-water solution 88 and the hummingbird can access the sugar-water solution 88 contained within the feed pod 64 through the access port 89 in the access cover 72. As also can be seen in FIG. 5, there is a feeder stem socket 90 for receiving a feeder stem (not shown in FIG. 5) for supporting the hummingbird feeder 10. FIG. 5 also shows the upper surface 78 of the feed pod 64, that may be a foil, that is punctured by the projection 80 when the access cover 72 is moved to its second position where the access cover 72 is closed over the pod support 66 and feed pod 64.

Accordingly, the pod support in each of the embodiments described herein is dimensioned and oriented so that the feed pod is held upright, with the top of the feed pod facing upward. According to various embodiments, therefore, longitudinal axis A (see FIG. 5) of the feed pod 64 is maintained at a 0° to 45° angle relative to the vertical (where vertical is 0°), and, preferably, no projection or other element of the hummingbird feeder 10 penetrates into the sugar-water solution during use. When a feed pod is empty or otherwise requires replacement, the access cover is lifted off or away from the feed pod so that the used feed pod can be readily removed and replaced with a new feed pod. The access cover is then repositioned over the new feed pod, and the projection pierces the top cover of the feed pod, making its contents available to the hummingbird by means of the access part and the concentric projection and through passageway in the access cover.

The hummingbird feeder 10 also includes several options to hang or mount the hummingbird feeder outside the house.

Figure 6:
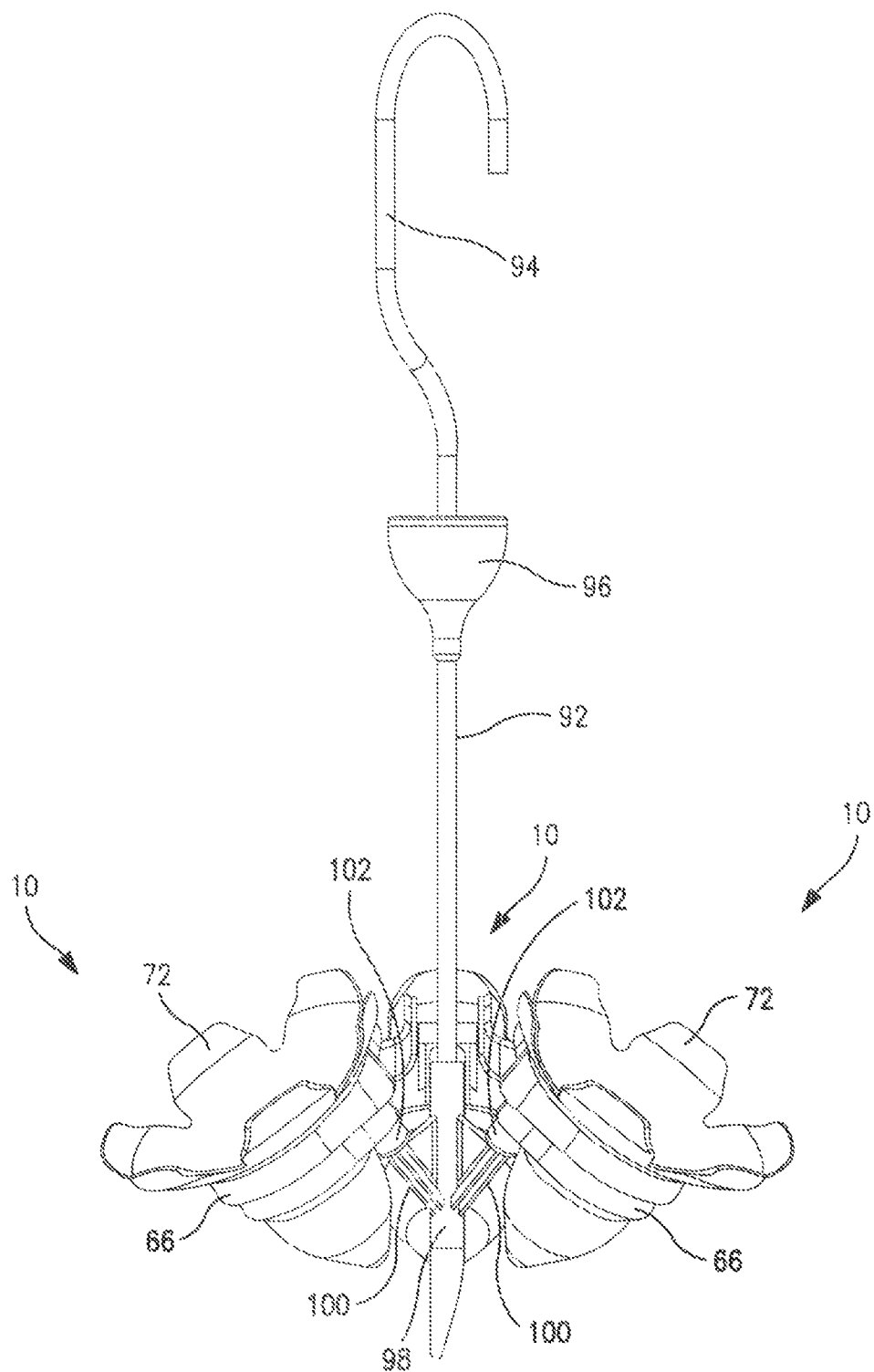
FIG. 6 is perspective view of a plurality of hummingbird feeders of the present invention with a hanging support.
Figure 12:
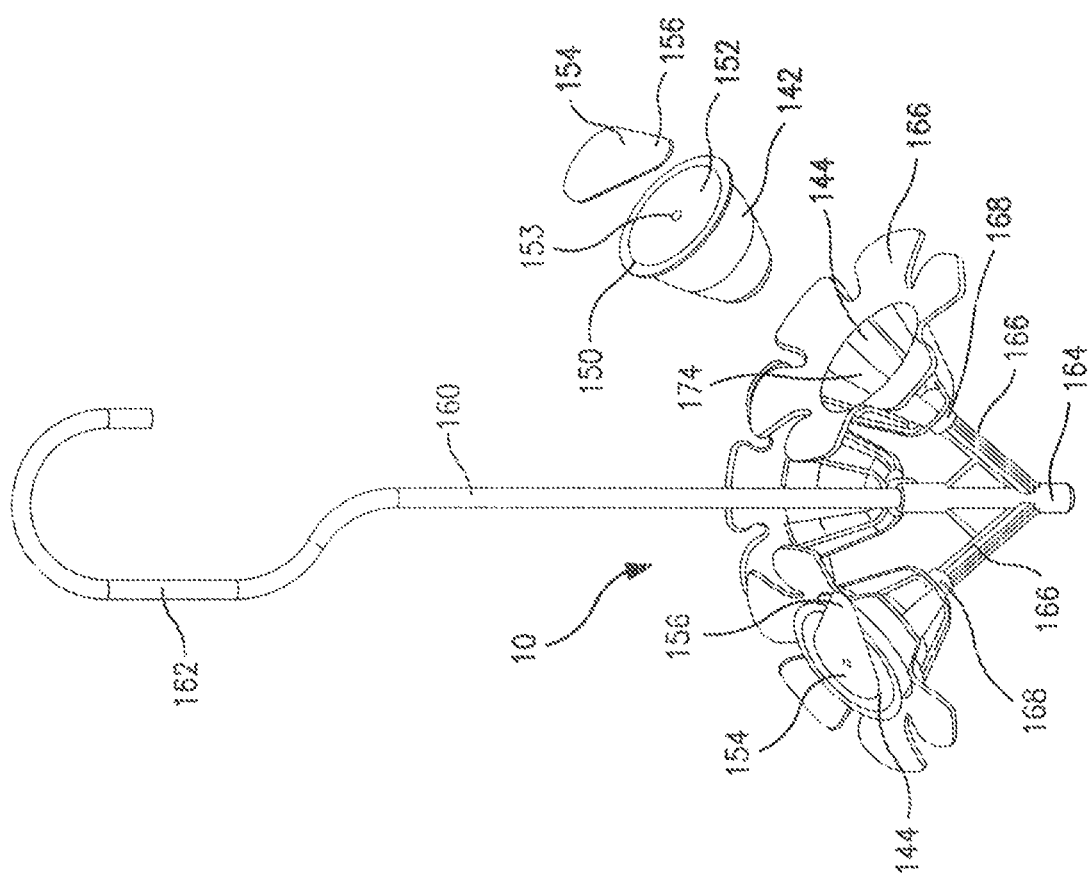
FIG. 12 is a partially exploded view of the feed pod of FIG. 10 and FIG. 11 in a multi-hummingbird feeder arrangement.

As such, in FIG. 6, there is shown a perspective view of a plurality of hummingbird feeders 10 mounted on a single hanger 92 having a hook 94 at the top in order to attach the hanger 92 to some stable element, such as a hook bracket mounted to a house, tree branch etc. The hummingbird feeders 10 can be the same as shown in FIGS. 4 and 5 and like numbers have been used for common components of the hummingbird feeders 10, however, as will become apparent, any other embodiment of the present hummingbird feeder can be used with the mounting arrangement shown in FIG. 6. At some location along the hanger 92, there is an ant dam 96 to prevent ants from progressing down the hanger 92 to access the sugar-water solution in one or more of the hummingbird feeders 10. At the lower end of the hanger 92, there is a hanger splitter 98 that is attached to the hanger 92 and provides a plurality of individual prongs 100 that extend at an angle upwardly and which attach to sockets 102 in each of the hummingbird feeders 10. As can be seen in FIGS. 6 and 12, both the hanger 92 and the stem splitter 98 have a configuration adapted to resemble the actual-size stem of a flower.

As shown, the sockets 102 are a part of the pod supports 66; however, the sockets 102 could be mounted to any portion of the hummingbird feeders 10 so as to position the hummingbird feeder 10 in a stable position. Also, as shown, there are three hummingbird feeders 10 that are supported by the hanger 92, it being seen that a greater or lesser number of hummingbird feeders 10 could be attached to the hanger 92.

Figure 7:
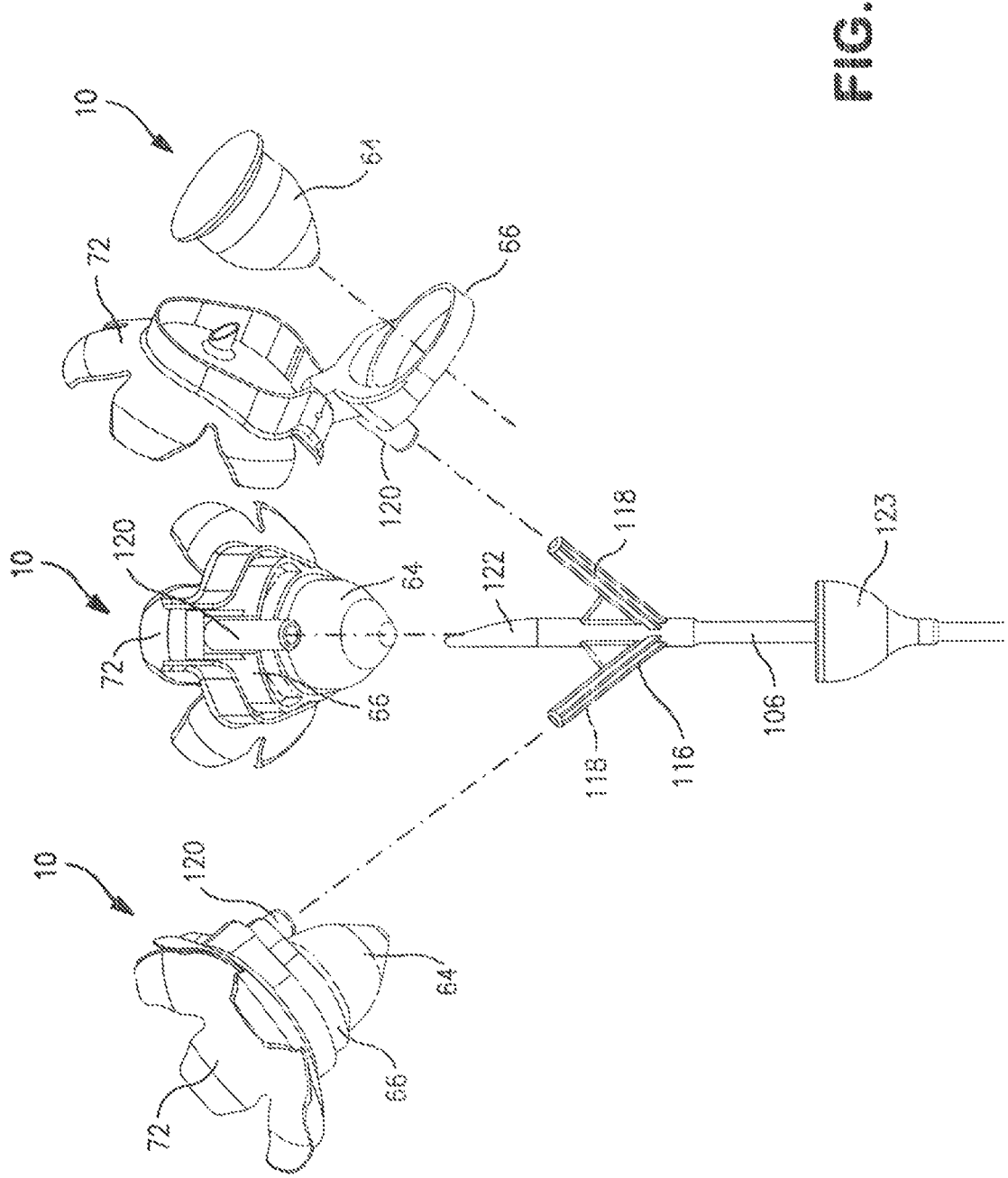
FIG. 7 is an exploded view of a plurality of hummingbird feeders of the present invention with a single feeder stem.

Turning to FIG. 7, there is shown a perspective view of a plurality of hummingbird feeders 10 mounted on a single vertical feeder stem 106. The hummingbird feeders 10 can be the same as shown in FIGS. 4 and 5 and like numbers have been used for components of the hummingbird feeders 10, however, as will become apparent, any other embodiment of the present hummingbird feeder can be used with the mounting arrangement of FIG. 7. According to this embodiment, stem splitter 116 may be provided with a plurality of prongs 118, each adapted to fit into a socket 120 in the bottom surface of a pod support 66. Stem splitter 116 may be provided with a central stem receiving socket 122 at one or both ends, which can also be configured to provide a perch for the hummingbirds. Again, an ant dam 123 is provided to keep ants from accessing the sugar-water solution in the feed pods 64.

Figure 8:
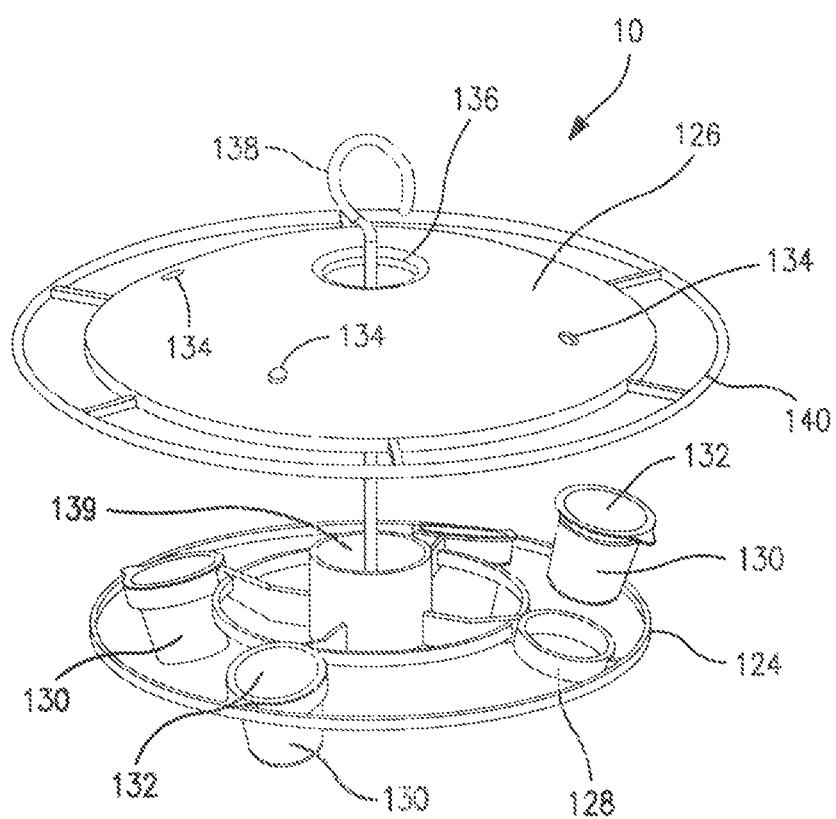
FIGS. 8 and 9 are perspective views of an alternative embodiment shown, respectively, in the open and closed positions.
Figure 9:
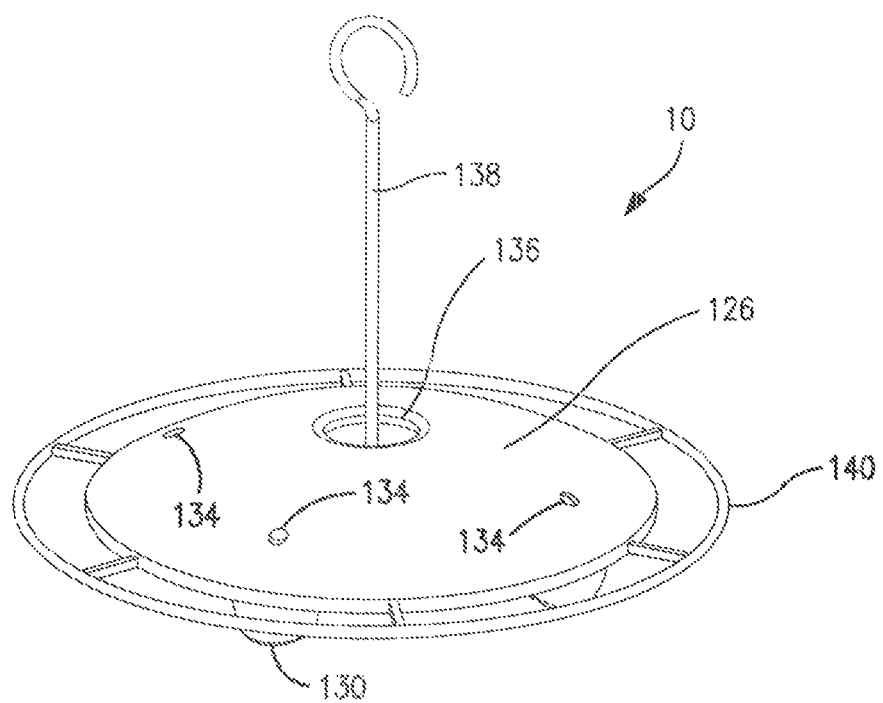

FIGS. 8 and 9 are perspective views of a saucer type of hummingbird feeder 10 having a pod support 124 and access cover 126. The pod support 124 contains a plurality of circular rings 128 for supporting the individual feed pods 130. To load the hummingbird feeder 10, the access cover 126 is lifted off the pod support 124 and the feed pods 130 are placed into the circular rings 128, and then the access cover 126 is lowered onto the pod support 124 to prevent access to the sugar water solution contained within the feed pods 130 by ants, bees and other pests.

The upper surface 132 of the feed pods 130 may, again, be foil or paper covering the tops of the feed pods 130 and may be removed or pierced prior to lowering the access cover 126 onto the pod support 124, or the access cover 126 may have projections corresponding to each feed pod 130 so that the foil or paper top upper surface 132 is pierced by the access cover 126 as the access cover 126 is lowered onto the pod support 124. The access cover 126 has ports 134 corresponding to the locations of each feed pod 130 so that the hummingbirds can access the sugar-water solution with their long beaks and tongues.

In addition, the access cover 126 may have a central hole 136 to allow the passage of a hanger 138 which is attached to the center of the pod support 124 in order to facilitate the hanging of the hummingbird feeder 10. A central reservoir 139 can also be present surrounding the hanger 138 that is filled with water to act as an ant dam. As can be seen, the access cover 126 may also have a perch 140 to allow the hummingbirds to stand on the perch 140 while feeding, instead of hovering. The perch 140 can, alternatively be a part of the pod support 124.

Turning then to FIG. 10, there is an exploded view of a hummingbird feeder 10 of the present invention and having an alternative feed pod 142. As can be seen, the feed pod 142 is in position to be fitted into a pod support 144, and, again, the feed pod 142 can be snapped into the pod support 144 or may simply rest in the pod support 144. The pod support 144 is configured to resemble a flower, but can take any shape and color that might be pleasing to a hummingbird.

Accordingly, the feed pod 142 can have a thin plastic bottom 146 and a generally cylindrical side 148 and may curve outwardly in the upward direction ending in an upper perimeter rim 150. Covering the space inwardly of the upper perimeter rim 150 is an inner top cover 152 and which is sealed entirely around the upper perimeter rim 150 so as to protect the sugar-water solution contained within the feed pod 142 from the external environment.

The inner top cover 152 has a center access hole 153 that is sized to provide the hummingbird access to the liquid hummingbird food contained in the feed pod 142. The inner top cover 152 may be comprised of a material that can be readily pierced, such as a foil or paper, for use as described in the embodiments of a hummingbird feeder previously described in the present specification. An outer top cover 154 can overlie, partially or fully, the inner top cover 152, covering and sealing the access hole 153 and further protecting the inner top cover 152 from the environment, a premature piercing or other breaching of the inner top cover 152 during shipping and handling.

The outer top cover 154 may be secured to the exterior of the inner top cover 152 by an adhesive that securely retains the outer top cover 154 to the inner top cover 152, covering and sealing the access hole 153, and yet is easily peeled off. There may be a tab 156 formed on the outer top cover 154 to facilitate that removal. Once the outer top cover 154 is removed, the hummingbirds are given free access to the hummingbird food through access hole 153. The inner top cover 152 can be colored red or other color that might attract hummingbirds as well as being aesthetically pleasing.

In the event the feed pod 142 is of the reusable type, the inner top cover 152 may be a reusable top rubber cover. In such case, the top rubber cover can be used in place of the foil top and will provide a seal around the outside of the feed pod 142. The top rubber cover can be removed and replaced during cleaning and refilling of the re-usable feed pod 142. The top cover will also have an access hole to provide access to the sugar-water food.

Turning, then to FIG. 11, taken along with FIG. 10, there is a perspective view of the completed hummingbird feeder 10 of FIG. 10 and, as can be seen, the feed pod 142 fits inside the pod support 144 leaving only the upper perimeter rim 150 visible as well as the inner top cover 152 and the outer top cover 154 and illustrating the ready access to the tab 156 for removal of the outer top cover 154. Again, once the outer top cover 154 is removed, the hummingbirds are given free access to the hummingbird food, through access hole 153. The important distinction versus previous described embodiments is that this embodiment requires no access cover. The hummingbird is provided access to the food simply by removing the outer top cover 154. The small access hole 153 limits ingress from bees and other insects by the size of the access hole.

Turning, finally, to FIG. 12, there is shown a partially exploded view illustrating a plurality of hummingbird feeders 10 as described in FIGS. 10 and 11 mounted on a single hanger 160 having a hook 162 at the top in order to attach the hanger 160 to some stable element, such as a hook mounted to a house or trellis. At the lower end of the hanger 160, there is a hanger splitter 164 that is attached to the hanger 160 and provides a plurality of individual stems 166 that extend at an angle upwardly and which attach to sockets 168 in each of the hummingbird feeders 10.

As can be seen, one of the feed pods 142 is illustrated so as to be mounted onto a pod support 144, and, again, that mounting arrangement can be by means of a snap fit of the feed pod 142 into the pod support 144 or the feed pod 142 may simply rest in the pod support 144. In FIG. 12, the feed pod 142 is the same as the feed pods 142 of FIGS. 10 and 11 and can be simply inserted into the pod supports 144. As previously illustrated in FIGS. 10 and 11, the feed pod 142 may have an inner top cover 152 and which is sealed entirely around the upper perimeter rim 150 so as to protect the sugar-water solution contained within the feed pod 142 from the external environment.

Again, the inner top cover 152 has an access hole 153, approximately at the center of the inner top cover 152, and may be comprised of a material that can be readily pierced, such as a foil or paper, for use as described in the prior embodiments of a hummingbird feeder in the present specification. An outer top cover 154 can overlie, partially or fully, the inner top cover 152 covering and sealing the access hole 153 and further protecting the inner top cover 152 from the environment, a premature piercing or other breaching of the inner top cover 152 during shipping and handling.

The outer top cover 154 may be secured to the exterior of the inner top cover 152 by an adhesive or other means that securely retains and seals the outer top cover 154 to the inner top cover 152 and yet is easily peeled off and there may be a tab 156 formed on the outer top cover 154 to facilitate that removal. Once the outer top cover 154 is removed, the hummingbirds are given free access to the hummingbird food through access hole 153.

Again, as shown, there are three hummingbird feeders 10 that are supported by the hanger 160, it being seen that a greater or lesser number of hummingbird feeders 10 could be attached to the hanger 160.

As is common to the aforedescribed embodiments, the upper opening of a feed pod has an outer perimeter rim forming that upper opening that is sealed by a top cover that requires some deliberate action by a user to provide access to the sugar-water solution contained therein. In one embodiment, the top cover may be breached by closing an access cover on the feeder that has been designed with a feature to pierce the top cover of the feed pod. The access may also be deliberately accomplished by having a inner top cover on the feed pod and an outer top cover such that the inner top cover has a hole therein and the upper top cover is deliberately removed from its position covering the inner top cover to make the hole, and sugar-water solution, available for use in accordance with the invention described herein.

In any event, the feed pod of this invention is initially sealed to protect the contents and keep the contents fresh until desired by the user and there is some deliberate action needed to access those contents to make the sugar-water solution ultimately available to a hummingbird.

While the present invention has been set forth in terms of a specific embodiment of embodiments, it will be understood that the present hummingbird feeder and feed pod for use therewith, may be modified or altered by those skilled in the art to other configurations. Accordingly, the invention is to be broadly construed and limited only by the scope and spirit of the claims appended hereto.

The invention claimed is:

1. A single-use, hummingbird feed pod that is provided by a provider for use by a hummingbird having a long beak and a tongue, said hummingbird feed pod comprising:
   a body forming a reservoir with a specified interior volume, said body having a tubular wall with top and bottom ends between which extends a longitudinal axis for said body, and a bottom surface which is attached to said bottom end, and said top end having a perimeter rim surrounding an opening into said reservoir, and wherein the distance between said ends, as measured along said longitudinal axis, defines the height of said body,
   a thin, inner cover that has a boundary edge, wherein said boundary edge has a configuration that allows said boundary edge to directly attach to the entirety of said perimeter rim without a portion of said inner cover extending outwardly beyond said perimeter rim,
   a quantity of liquid hummingbird food contained within said reservoir,
   wherein said inner covering having an access hole therein that is configured to allow the long beak and tongue of said hummingbird to pass through said access hole so as to gain access to said liquid hummingbird food in said reservoir while also preventing said access to insects,
   wherein said height of said body is set so that the long beak and tongue of said hummingbird, after passing through said access hole, reaches a point proximate said bottom surface of said body when said hummingbird is perched above said feed pod,
   wherein the entirety of said body having a configuration adapted to resemble the center of a single, actual-size flower having a plurality of petals and that is attached to a stem from which said flower grows so that the entire specified interior volume of said body fits within a region defined by the spreading of said petals of said single, actual-size flower and a thickening part of said stem from which said single, actual-size flower grows, and
   a thin, elongated, peel-tab, single-use, outer cover having a graspable end and a configuration adapted to attach to said inner cover so as to temporarily seal said access hole until said graspable end is used by said provider to peel off said outer cover from said inner cover so as to provide a hummingbird access to said liquid hummingbird food contained within said reservoir.

2. The hummingbird feed pod of claim 1 wherein:
   said body is fabricated from a translucent material to provide external visibility of said liquid hummingbird food contained within said reservoir.

3. The hummingbird feeder of claim 1 wherein the access cover is attached to the pod support.

4. The hummingbird feeder of claim 1 wherein the access cover is pivotally attached to the pod support.

5. The hummingbird feeder of claim 1 wherein the pod support is a ring member having a circular opening for receiving a feed pod.

6. The hummingbird feeder of claim 1 wherein the access cover has a top surface that is configured in an aesthetically pleasing shape and a bottom surface configured to engage a feed pod in a friction, screw, or snap fit.

7. A hummingbird feeder for use by a hummingbird having a long beak and a tongue, said hummingbird feeder comprising:
   a feed pod support having a configuration adapted to hold and support a hummingbird feed pod, and
   a hummingbird feed pod positioned within said feed pod support, said hummingbird feed pod comprising:
   a body forming a reservoir with a specified interior volume, said body having a tubular wall with top and bottom ends between which extends a longitudinal axis for said body, and a bottom surface which is attached to said bottom end, and said top end having a perimeter rim surrounding an opening into said reservoir, and wherein the distance between said ends, as measured along said longitudinal axis, defines the height of said body,
   a thin, inner cover that has a boundary edge, wherein said boundary edge has a configuration that allows said boundary edge to directly attach to the entirety of said perimeter rim without a portion of said inner cover extending outwardly beyond said perimeter rim, a quantity of liquid hummingbird food contained within said reservoir, wherein said inner covering having an access hole therein that is configured to allow the long beak and tongue of said hummingbird to pass through said access hole so as to gain access to said liquid hummingbird food in said reservoir while also preventing said access to insects, wherein said height of said body is set so that the long beak and tongue of said hummingbird, after passing through said access hole, reaches a point proximate said bottom surface of said body when said hummingbird is perched above said feed pod, wherein the entirety of said body having a configuration adapted to resemble the center of a single, actual-size flower having a plurality of petals and that is attached to a stem from which said flower grows so that the entire specified interior volume of said body fits within a region defined by the spreading of said petals of said single, actual-size flower and a thickening part of said stem from which said single, actual-size flower grows, and a thin, elongated, peel-tab, single-use, outer cover having a graspable end and a configuration adapted to attach to said inner cover so as to temporarily seal said access hole until said graspable end is used by said provider to peel off said outer cover from said inner cover so as to provide a hummingbird access to said liquid hummingbird food contained within said reservoir.

8. The hummingbird feeder of claim 7 wherein the feed pod support comprises a plurality of circular rings wherein each circular ring supports a removable feed pod.

9. The hummingbird feeder of claim 8 wherein the hummingbird feeder includes an access cover that covers the pod support and the feed pods supported within the plurality of circular rings, the access cover having a plurality of ports generally in alignment with the circular rings to allow access to the fed pods by a hummingbird.

10. The hummingbird feeder of claim 8 wherein the access cover has a plural of projections that are generally aligned with the feed pods supported by the plurality of circular rings that pierce the inner top cover of the feed pods when the access cover is positioned over the feed pod support.

11. The hummingbird feeder of claim 7, further comprising a stem splitter having a configuration adapted to resemble the actual-size stem of a flower and to support a plurality of said feed pod supports.

12. The hummingbird feeder of claim 11, wherein said configuration of said stem splitter further adapted to orient the longitudinal axis of the feed pod at an angle of up to 45 degrees relative to vertical.

* * * * *